United States Patent
Nordenfelt et al.

(10) Patent No.: US 9,952,047 B2
(45) Date of Patent: Apr. 24, 2018

(54) METHOD AND MEASURING INSTRUMENT FOR TARGET DETECTION AND/OR IDENTIFICATION

(71) Applicant: Trimble AB, Danderyd (SE)

(72) Inventors: Mikael Nordenfelt, Vallentuna (SE); Mikael Hertzman, Sollentuna (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 15/405,072

(22) Filed: Jan. 12, 2017

(65) Prior Publication Data

US 2017/0122734 A1    May 4, 2017

Related U.S. Application Data

(63) Continuation of application No. PCT/EP2014/065148, filed on Jul. 15, 2014.

(51) Int. Cl.
| | |
|---|---|
| *G01C 15/00* | (2006.01) |
| *G01C 15/06* | (2006.01) |
| *G01S 17/02* | (2006.01) |
| *G01S 17/66* | (2006.01) |
| *H04N 5/225* | (2006.01) |

(52) U.S. Cl.
CPC .......... *G01C 15/002* (2013.01); *G01C 15/06* (2013.01); *G01S 17/023* (2013.01); *G01S 17/66* (2013.01); *H04N 5/2256* (2013.01); *H04N 5/2259* (2013.01)

(58) Field of Classification Search
CPC .................................................. G01C 15/002
See application file for complete search history.

(56) References Cited

U.S. PATENT DOCUMENTS

| | | | |
|---|---|---|---|
| 8,620,163 B1 * | 12/2013 | Sleator | ................ H04B 10/116 348/116 |
| 2009/0220144 A1 | 9/2009 | Mein et al. | |
| 2010/0322482 A1 | 12/2010 | Kochi et al. | |
| 2012/0081690 A1 | 4/2012 | Nagai et al. | |
| 2013/0278758 A1 | 10/2013 | Von Matern | |

OTHER PUBLICATIONS

International Search Report for Application No. PCT/EP/2014/065148 dated Sep. 29, 2014, 4 pages.
Written Opinion for Application No. PCT/EP/2014/065148 dated Sep. 29, 2014, 6 pages.

* cited by examiner

*Primary Examiner* — James Pontius
(74) *Attorney, Agent, or Firm* — Kilpatrick Townsend & Stockton LLP

(57) ABSTRACT

The present disclosure relates to a measuring instrument and a method implemented in such a measuring instrument. The measuring instrument includes an image sensor, an actuator, a control unit and a processor. The actuator is arranged to move a field of view of the image sensor. The control unit is configured to cause the image sensor to capture at least one digital image during motion of the field of view of the image sensor by the actuator. The exposure time for capturing the digital image is longer than an identifiable section of a regulating pattern for modulation of an optical radiation either emitted or reflected by at least one target. The processor is configured to process at least a portion of the captured image for detecting in the at least one portion the identifiable section of the regulating pattern. Such a measuring instrument is advantageous for detecting and/or identifying a target in the vicinity of the instrument.

20 Claims, 6 Drawing Sheets

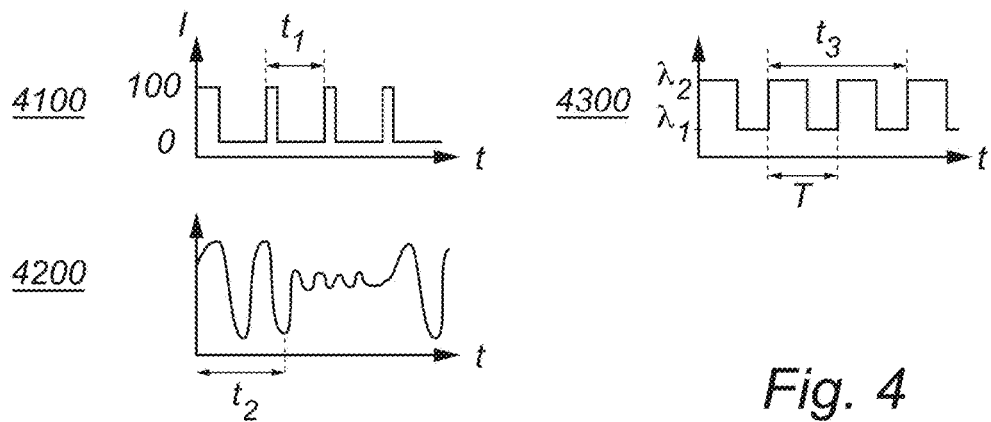
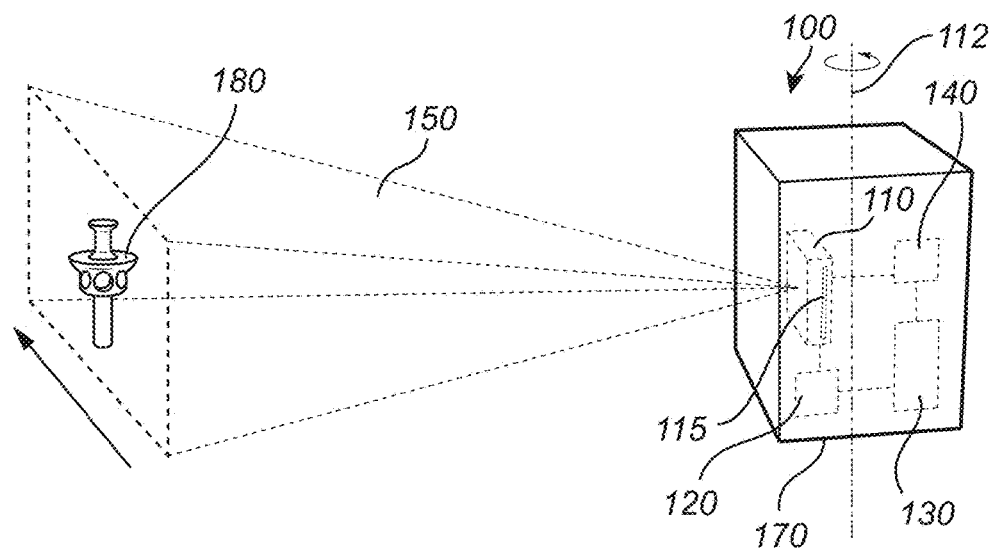
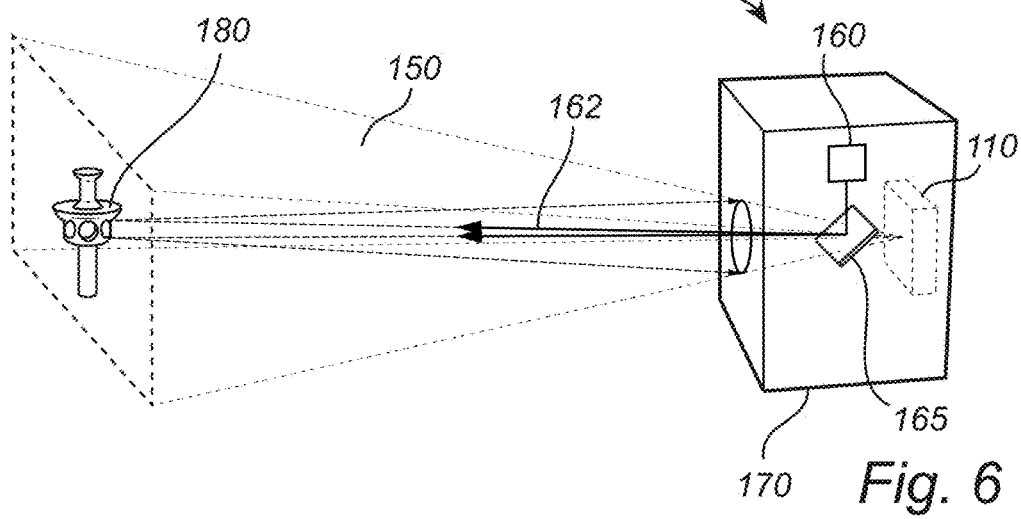

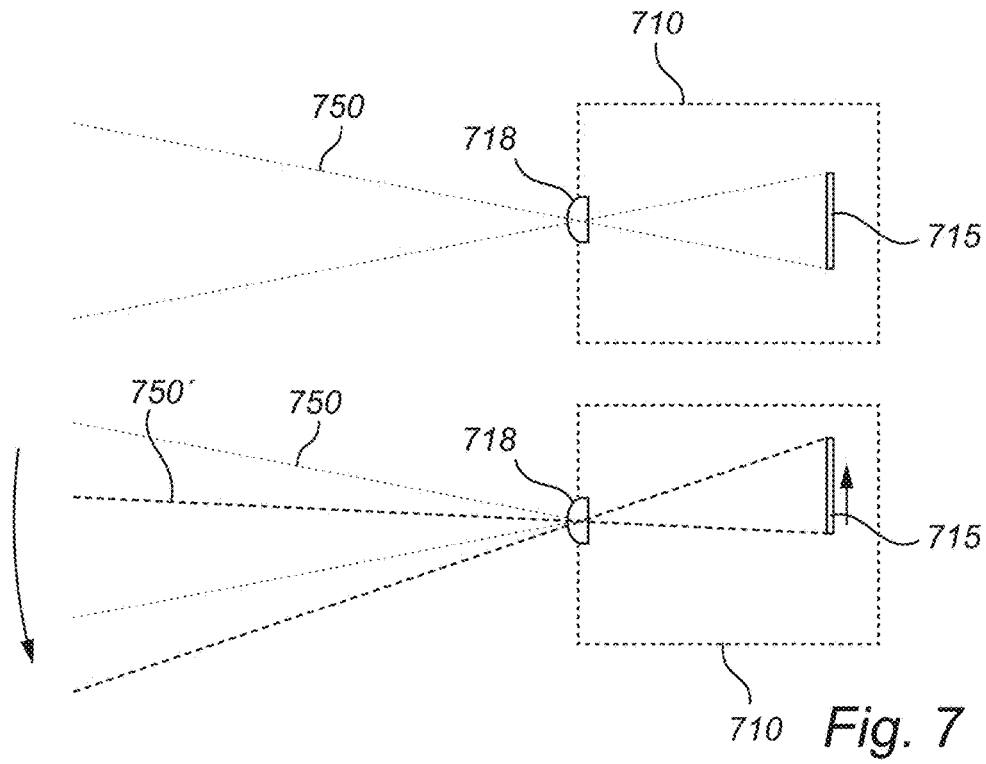
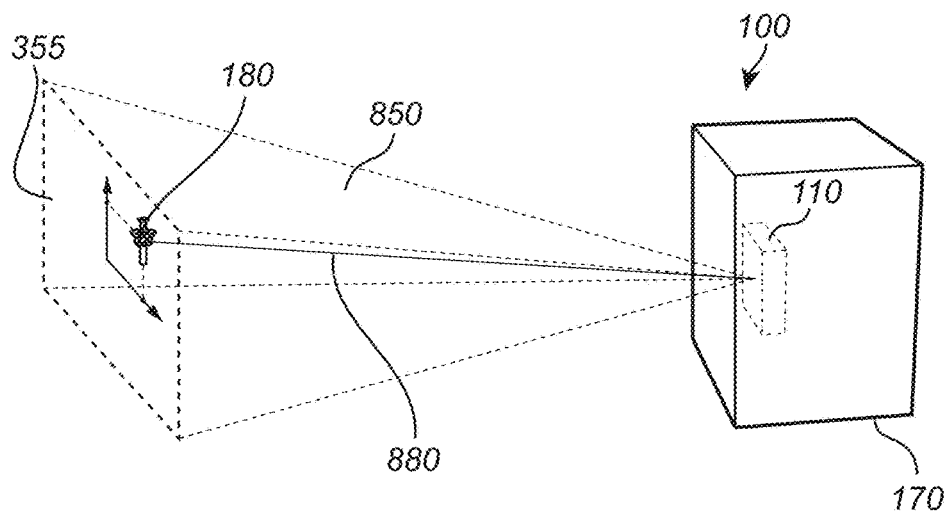
Fig. 7
Fig. 8

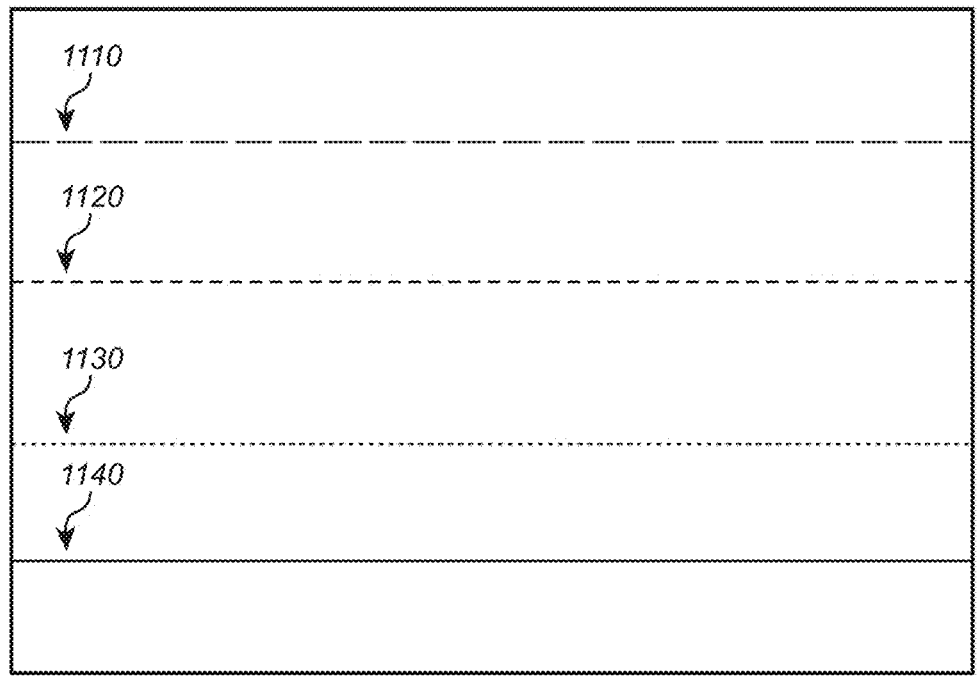
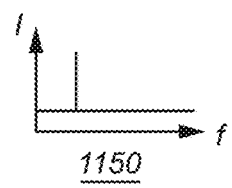
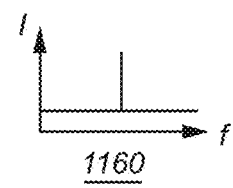
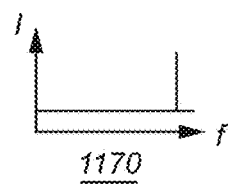
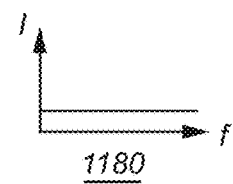
Fig. 11

METHOD AND MEASURING INSTRUMENT FOR TARGET DETECTION AND/OR IDENTIFICATION

CROSS-REFERENCE TO RELATED APPLICATIONS

This application is a Continuation of International Application No. PCT/EP2014/065148, filed Jul. 15, 2014, the entire contents of which are incorporated by reference herein for all purposes.

TECHNICAL FIELD

The present disclosure generally relates to the art of land surveying. In particular, the present disclosure relates to a measuring instrument such as a geodetic instrument adapted to detect and/or identify a target. The present disclosure relates also to a method implemented in a measuring instrument.

BACKGROUND

The art of surveying involves the determination of unknown positions, surfaces or volumes of objects using measurements of angles and distances. For this purpose, a surveying instrument may comprise an electronic distance measuring device (EDM) which may be integrated with angle sensors in a so-called total station. A distance measuring total station combines electronic, optical and computer techniques and may furthermore be provided with a computer or control unit with writable information for controlling the measurements to be performed and for storing data obtained during the measurements. The total station may also comprise a tracking function, i.e. the total station may comprise a target tracker (or tracker unit). For tracking purposes, the total station may also include servo drives.

An optical quadrant tracker, or simply quadrant tracker, can be used to measure angular deviation of an optical radiation, e.g., a focused optical radiation such as a laser beam, from its ideal line-of-sight path and provide deviation signals indicative of the angular deviation from the ideal line-of-sight path in order to enable corrective adjustment of the line-of-sight path. The quadrant tracker typically comprises a photodetector enabling detection of a modulated signal contained in the optical radiation.

Tracking of a target in the vicinity of a measuring instrument, for instance for searching for, locking onto and/or identifying the target, may be performed using such a quadrant tracker.

Other techniques for obtaining these functionalities, and in particular for identifying the presence of a target, may be based on digital imaging using e.g. a CMOS sensor or the like. However, there is still a need to provide new methods and instruments improving these functionalities.

SUMMARY

The present disclosure seeks to provide an improved method and an improved measuring instrument for detecting presence of and/or identifying a target.

To achieve this, a measuring instrument and a method having the features as defined in the independent claims are provided. Further advantageous embodiments of the present disclosure are defined in the dependent claims.

According to a first aspect, a method implemented in a measuring instrument for detecting presence of at least one target is provided. In the method, a field of view of an image sensor of the measuring instrument is caused to move relative to the at least one target and at least one digital image is captured with the image sensor under motion of the field of view using an exposure time which is longer than an identifiable section of a regulating pattern for modulation of an optical radiation either emitted or reflected by the at least one target. At least a portion of the captured image is processed for detecting in the at least one portion the identifiable section of the regulating pattern.

According to a second aspect, a measuring instrument is provided. The measuring instrument includes an image sensor, an actuator, a control unit and a processor. The actuator is arranged to move a field of view of the image sensor. The control unit is configured to cause the image sensor to capture at least one digital image during motion of the field of view by the actuator. The exposure time for capturing the digital image is longer than an identifiable section of a regulating pattern for modulation of an optical radiation either emitted or reflected by at least one target. The processor is configured to process at least a portion of the captured image for detecting in the at least one portion the identifiable section of the regulating pattern.

The method of the first aspect and the measuring instrument of the second aspect are advantageous in that an identifiable section of a regulating pattern used for modulation of an optical radiation may be detected in the captured image, thereby indicating presence of a target in the vicinity of the measuring instrument. With its field of view under motion, the image sensor captures a digital image using an exposure time which is longer than the identifiable section of the regulating pattern. Generally, the method and the measuring instrument in accordance with the embodiments disclosed herein take benefit of a transformation from the time domain to the spatial domain.

Assuming that the field of view, as moved by the actuator, covers the location at which the target is placed, a reproduction (or pattern) of the identifiable section will be present in the captured digital image and can be distinguished from the remaining of the digital image, as further explained below.

On the one hand, the motion of the field of view of the image sensor during capture of the digital image induces motion blur in the image along the direction of the movement. In particular, the surroundings of the target become blurred in the captured digital image. In other words, motion blur causes surroundings of the target to exhibit a blurred or smeared structure in the captured digital image. It will be appreciated that the surroundings of the target may be any object other than the target such as inactive targets in the sense that these inactive targets do not transmit any optical radiation to the measuring instrument, even by reflection, or that they at least do not emit light under the conditions specified above (i.e. that, for such targets, the exposure time is not longer than an identifiable section of a regulating pattern for amplitude modulation of the optical radiation). Motion blur causes the surroundings to become spatially distorted in the captured digital image.

On the other hand, an optical radiation emitted or reflected by the at least one target and modulated according to a regulating pattern under motion of the field of view of the image sensor results in a distinct pattern, or repeatedly occurring structures (in the case of a periodic modulation of the amplitude), in the captured digital image when the exposure time is longer than an identifiable section of the regulating pattern for modulation of the optical radiation.

Generally, the motion of the field of view under the exposure time causes the background of the captured image to become blurred (i.e. not clear), or at least more blurred, than the pattern representative of e.g. a blinking light source or optical radiation modulated according to another identifiable pattern (or identifiable section of a regulating pattern) in the image. As a result, the pattern representative of the image of the blinking light source (or blinking target), or optical radiation modulated in amplitude or wavelength (which may not necessarily be a "blinking" pattern), can be distinguished from the background, thereby indicating presence of the target in the scene imaged by the image sensor.

Further, the digital image may be processed to determine a characteristic of the optical radiation, such as the frequency for modulation in the case of a repetitive regulating pattern, or another parameter representative of an identifiable section of a regulating pattern for modulation, thereby enabling identification or recognition of the target.

It will be appreciated that more than one target may be detected in the captured image if the respective patterns representative of these targets are different and sufficiently distinct (not overlapping) in the captured image.

An advantage of the present method and gfeodetic instrument is to obtain a time-discrete camera tracker sensitive to rapid blinking patterns and allow for recognition of target IDs.

According to an embodiment, the regulating pattern provides an amplitude modulation of the optical radiation and/or a wavelength modulation of the optical radiation.

For example, a periodic regulation of the amplitude modulation of the optical radiation emitted by (or reflected by) the target may result in an at least partially periodic pattern in the captured image (as revealed by the intensities or brightness levels in the pixels of the captured image). It is sufficient if at least an identifiable section of the periodic regulation (or regulating pattern) is detected. The digital image, or at least a portion of it, may be processed for detecting such an identifiable section. The detected pattern may extend in the digital image in a direction parallel to a direction of motion of the field of view of the image sensor. In the case of a periodic modulation of the amplitude of the optical radiation, for example with a blinking target or with a blinking light source emitting optical radiation towards a target, such a pattern may in the digital image comprise a series of spots having an increased brightness (i.e. a series of bright pixels) compared with other portions (or pixels) of the image. These spots may occur repeatedly, for example at least partially periodic (e.g. quasi-periodic), in the digital image. The repeated occurrence of the spots along a line in the captured image is caused by the combination of the periodic amplitude modulation of the optical radiation emitted by, or reflected by, the target and the motion of the field of view of the image sensor while capturing the image.

According to another example, a periodic regulation of the wavelength of the optical radiation emitted by (or reflected by) the target results in a captured image in which the color varies along an axis or line corresponding to the direction of motion of the field of view of the image sensor. The position of the axis or line in the captured image depends on the position of the target. The variation in color indicates the presence of a target in the vicinity of the measuring instrument. The number of color shifts and their positions in the captured image depend on the frequency used in the regulating pattern for wavelength modulation and the speed of the motion of the field of view of the image sensor. Still, it is sufficient if at least an identifiable section of the periodic regulation (or regulating pattern) is detected. The digital image, or at least a portion of it, may be processed for detecting such an identifiable section.

The digital image may be processed in the shade plane to identify the positions of the color shifts along the axis corresponding to the direction of motion of the field of view. Alternatively, the digital image may be processed by analyzing a specific color channel. If the optical radiation is modulated to alternatively provide green and red light, the data obtained from the red channel of the captured digital image effectively results in a blinking diode. Filtering out one of the colors used for wavelength modulation provides data in which a repeated occurrence of spots (for the remaining color) along a line in the captured image is detected, as for the amplitude modulation. Thus, although the amplitude of the optical radiation may remain constant, analyzing a specific color channel may provide the same result as imaging a blinking diode. Further, as other processing alternatives, the image may be converted from RGB (red, green, blue) to HSV (Hue, Saturation, Value) where a color shift will appear mostly in the Hue channel.

In the following, any example or configuration based on amplitude modulation may be equally applied to an example or configuration based on wavelength modulation, and vice versa.

According to an embodiment, the identifiable section may include at least two distinguishable events of the regulating pattern for modulation, i.e. two timely distinct events. Alternatively, the identifiable section may correspond to more than one period for modulation of the optical radiation.

Referring to amplitude modulation, the two distinguishable events may for example be two maximum (or peaks), one maximum and one minimum, or any other kinds of variations in amplitude modulation of the optical radiation. Referring to wavelength modulation, the two distinguishable events may be two shifts in wavelength (color).

As a result, a specific pattern, or points corresponding to the at least two distinguishing events, may be detected in the captured digital image, and a period of time representative of the detected pattern, or a period of time between the two events, may be determined by analyzing the detected pattern, i.e. by measuring the distance between two such points in the captured image. It may then be possible to relate the pattern, or at least two points detected in the capture image, to the pattern effectively used for modulating the amplitude or wavelength of the optical radiation.

As mentioned above, the optical radiation may be modulated periodically, for example with a regulating pattern including a series of peaks (or wavelength shifts) providing a blinking optical radiation. In the present embodiment, if the modulation frequency of the optical radiation and the motion speed of the field of view of the image sensor are substantially constant or even constant, the distance between consecutive spots in the digital image will be substantially the same. If the modulation frequency is varied and the motion speed is kept constant, then the distance between the spots in the digital image will vary. Similarly, if the modulation frequency is kept constant and the motion speed is varied, then the distance between the spots in the digital image will vary.

The method and measuring instruments according to these embodiments are advantageous in that they provide a more sensitive method and measuring instrument for detecting and/or identifying two targets employing modulation frequencies that only slightly differ from each other (e.g., differ by a few percent). Generally, the method and measuring instruments according to these embodiments may be used for detecting a target in the vicinity of a measuring instrument and locking the measuring instrument onto a target, i.e. for tracking purposes.

It will be appreciated that both active and passive targets may be used. An active target is a target which itself emits an optical radiation and may therefore include a light source. An active target may emit light with an amplitude modulation according to a specific regulating pattern. The geodetic instrument may therefore also be equipped with a communication module (receiver/transceiver) for receiving such information from the target. Alternatively, an active target may be able to emit optical radiation modulated in amplitude or wavelength according to different patterns. The active target may be equipped with a communication module for communicating with the measuring instrument its regulating pattern, or at least an identifier such that the measuring instrument is informed about the actual regulating pattern used by the target. Alternatively, the measuring instrument may be equipped with an input module for user entry indicating which target, and thereby what regulating pattern or at least a portion of it (i.e. an identifiable section), is to be detected.

A passive target is a target which does not itself emit optical radiation but instead includes a reflector or at least a reflective surface for reflecting light. For applications with passive targets, the measuring instrument may further comprise a light source arranged to emit optical radiation. According to an embodiment, the optical radiation is emitted from the measuring instrument in a direction of the field of view of the image sensor. The optical radiation emitted by the light source of the measuring instrument will be reflected against the passive target and travel back to the measuring instrument.

Generally, the measuring instrument may further comprise a first optical element such as a lens or an optical objective determining the field of view of the image sensor. The image sensor, the first optical element and/or any additional optical element or objective may together define a camera.

According to an embodiment, the motion of the field of view may include a rotation, i.e. the field of view of the image sensor may be rotated. In particular, the field of view may be rotated by translating the image sensor relative to the first optical element or vice versa. Alternatively, the field of view may be rotated by rotating the first optical element and the image sensor together. In other words, the field of view may be rotated by rotating the camera about an axis relative to a base (or fixed support) of the measuring instrument. According to yet another alternative, the field of view may be rotated by introducing or moving a second optical element in an optical path defined by the first optical element and the image sensor.

According to another embodiment, the motion of the field of view may include a translation, i.e. the field of view of the image sensor may be translated. In this embodiment, it may be assumed that the direction of the field of view is maintained constant while the camera's viewpoint is moved. The field of view may be translated by translating both the image sensor and the first optical element. It will be appreciated that the translation may be defined relative to a base (or fixed support) of the measuring instrument, which will also define a scale (depending on the distance to the target) for any pattern detected in the digital image.

It will be appreciated that the motion of the field of view may include both rotation and translation. In particular, a rotation of the camera may induce a certain level of translation, especially if the camera is arranged eccentric to the line of sight of the measuring instrument.

The field of view may also be moved according to other alternatives.

For example, the field of view may be moved by zooming in or out, i.e. by increasing or decreasing the field of view by means of e.g. an optical objective, during the exposure time. In this case, a target may be detected at the periphery of the field of view (where motion blur is obtained for the background of the image), as long as the target is still present in the image upon the change in size of the field of view. As another example, it may be envisaged that the field of view may be moved by rotating the image sensor about an axis extending from a center of the image sensor to a center of the first optical element (or an optical element associated with the image sensor to form the camera). This latter example is also applicable for detecting a target at the periphery of the field of view since this corresponds to the region of the field of view for which a blurred image of the surroundings will be obtained while a sharper image of the optical radiation arising from the target (either by direct emission or via reflection) will be obtained.

The driving means (or actuator(s)) of the measuring instrument may be adapted to provide the translation and/or rotation of the field of view of the image sensor.

In the case of rotation of the field of view, the method may further comprise the step of determining a direction to the at least one target relative to the measuring instrument on the basis of a profile for angular orientation of the field of view of the image sensor with which the image is captured and a position of the identifiable section of the pattern in the captured image (or any image representation derived from the captured image). In this embodiment, the angular orientation of the field of view (relative to the measuring instrument) may be recorded by a sensor coupled to the actuator or any moving part providing the rotation of the field of view such that a profile of the angular orientation as a function of time is obtained. Depending on the profile and in particular the rotation speed, a rotation angle (or angular orientation) may be correlated to a pixel of the digital image such that the position of a spot, or any other identifiable part of the regulating pattern used for modulation of the optical radiation in the captured image, corresponds to an angular orientation.

According to an embodiment, a direction to, and/or a position of, the at least one target relative to the measuring instrument may be determined on the basis of a profile for translational position of the field of view of the image sensor with which the image is captured and a position of the identifiable section of the pattern in the captured image (or any image representation derived from the captured image). In analogy with the preceding embodiment, the translational position of the field of view may be recorded as a function of time by a sensor coupled to the actuator or any moving part providing the translation of the field of view. Depending on the profile and in particular the translation speed, a direction and/or a position may be correlated to a pixel of the digital image such that the position of a spot or any other identifiable part of the regulating pattern used for modulation of the optical radiation in the captured image corresponds to a direction to a target and/or a position of the target.

According to an embodiment, the identifiable section of the regulating pattern may be compared with at least part of a pattern detected in the captured image. In this embodiment, the regulating pattern used for modulation of the optical radiation is known to the measuring instrument and thereby to its processor. The measuring instrument may be informed by the target itself or the information may be input in the measuring instrument by an operator.

According to an embodiment, the processing may include identifying the identifiable section of the pattern for modulation on the basis of at least part of a pattern detected in the at least one portion of the captured image and a motion speed, or displacement profile, of the field of view of the image sensor.

According to an embodiment, the processing may include at least one of the following techniques: image frequency analysis, wavelet analysis and template/pattern matching (comparison between a detected pattern with a list of known patterns in a look-up table or similar register). The processing may also include transforming at least a portion of the captured image from a spatial domain representation into a spatial frequency domain representation (such as via Fourier transform).

According to an embodiment, the regulating pattern may provide information about the target. The present embodiment is applicable for active targets and the information may for example include the position of the target, the type of target and/or the height of the target above the ground (if the target is mounted on a geodetic pole for instance).

According to another embodiment, an identity of the at least one target may be determined based on at least part of a pattern detected in the captured image. The measuring instrument may comprise a memory, a look-up table or entry means providing a correlation between a specific pattern and a target identity. Recognizing a pattern, or determining at least a portion of a pattern, allows for an identification of the target by the measuring instrument.

According to a third aspect, a computer program product is provided. The computer program product comprises computer-executable components for causing a tracker unit or measuring instrument to perform a method according to the first aspect of the present disclosure and any one of its derived embodiments when the computer-executable components are executed on a processing unit.

In the context of the present application, the wording measuring instrument, total station, survey unit, surveying instrument, geodetic instrument or geodetic scanner may be used interchangeably.

The steps of any method disclosed herein do not have to be performed in the exact order disclosed, unless explicitly stated.

The present disclosure relates to all possible combinations of features recited in the claims. Further, any embodiment described with reference to the method according to the first aspect of the present disclosure may be combinable with any one of the embodiments described with reference to the measuring instrument according to the second aspect of the present disclosure and the computer program product according to the third aspect of the present disclosure and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which:

FIG. 4 shows examples of regulating patterns used for modulation of the optical radiation according to some embodiments;

FIG. 5 is a schematic illustration of a measuring instrument according to an embodiment;

FIG. 6 is a schematic illustration of an exemplifying embodiment with a measuring instrument including a light source;

FIG. 7 illustrates the rotation of the field of view of an image sensor in a measuring instrument according to an embodiment;

FIG. 8 illustrates the determination of an angular orientation of a target based on an image captured by a measuring instrument according to an embodiment;

FIG. 11 illustrates exemplifying regulating patterns for amplitude modulation of a number of targets and schematic representations of their corresponding Fourier transforms.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

The present disclosure will now be described more fully hereinafter with reference to the accompanying drawings, in which exemplifying embodiments are shown. The invention may however be embodied in many different forms and should not be construed as limited to the embodiments set forth herein, these embodiments are rather provided by way of examples.

Figure 1:
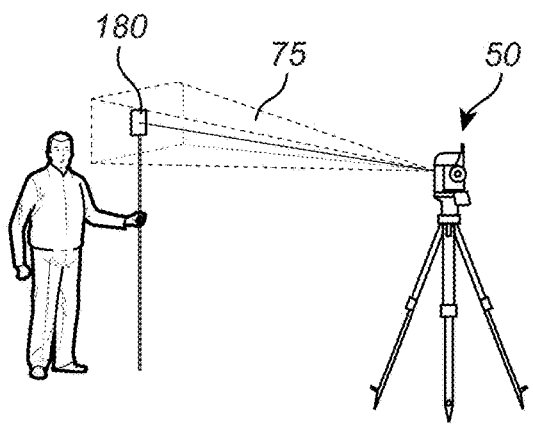
FIG. 1 illustrates the general technical field of use of a measuring instrument according to an embodiment.

With reference to FIG. 1, the general technical field of use of a measuring instrument according to an embodiment is illustrated.

FIG. 1 shows a measuring instrument 50, such as a geodetic instrument, with a field of view 75 for observing a target 180. In this example, the target 180 is mounted on a geodetic pole hold by an operator. The geodetic instrument 50 may generally be equipped with an electronic distance measurement unit for measuring a distance from the instrument 50 to the target 180. Further, the geodetic instrument 50 may be equipped with tracking functionalities or a tracking unit for locking onto the target 180 and following the target 180 upon motion of the operator from one position to another. For these purposes, the measurement instrument 50 may also be equipped with angle sensors and servo drives. The measuring instrument 50 may be used for land surveying using either active targets or passive targets.

Figure 2:
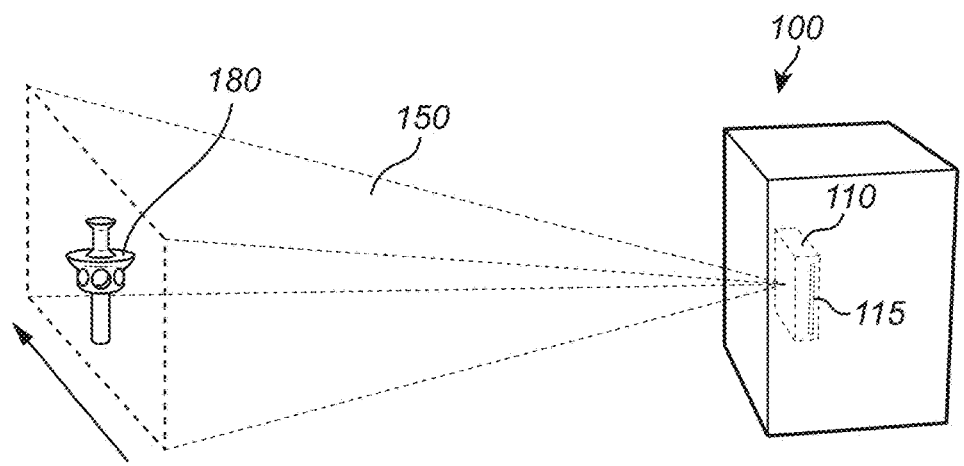
FIG. 2 is a schematic illustration of a measuring instrument according to an embodiment.

With reference to FIG. 2, a measuring instrument 100 according to an embodiment is described in more detail. The measuring instrument 100 may be used in land surveying applications such as illustrated in FIG. 1.

FIG. 2 shows a schematic view of the measuring instrument (or geodetic instrument) 100 which comprises an image sensor 115 having a field of view 150.

The image sensor (or imaging module) 115 is a device or component converting an optical image into electric signals. The image sensor 115 may be part of a camera 110. Although not shown in detail in FIG. 2, the camera may also include a first optical element (illustrated in FIG. 7 for instance) and optionally additional optical elements or optical objectives. These optical elements may be considered to be integrated in the camera denoted 110.

The image sensor 115 may be a charge coupled device (CCD), a complementary metal oxide semiconductor (CMOS) image sensor or any other type of digital pixel sensor configured to provide a digital image. The image sensor 115 may be characterized by its resolution, i.e. the number of pixels in the picture (or rather a number of pixels per area).

Figure 3:
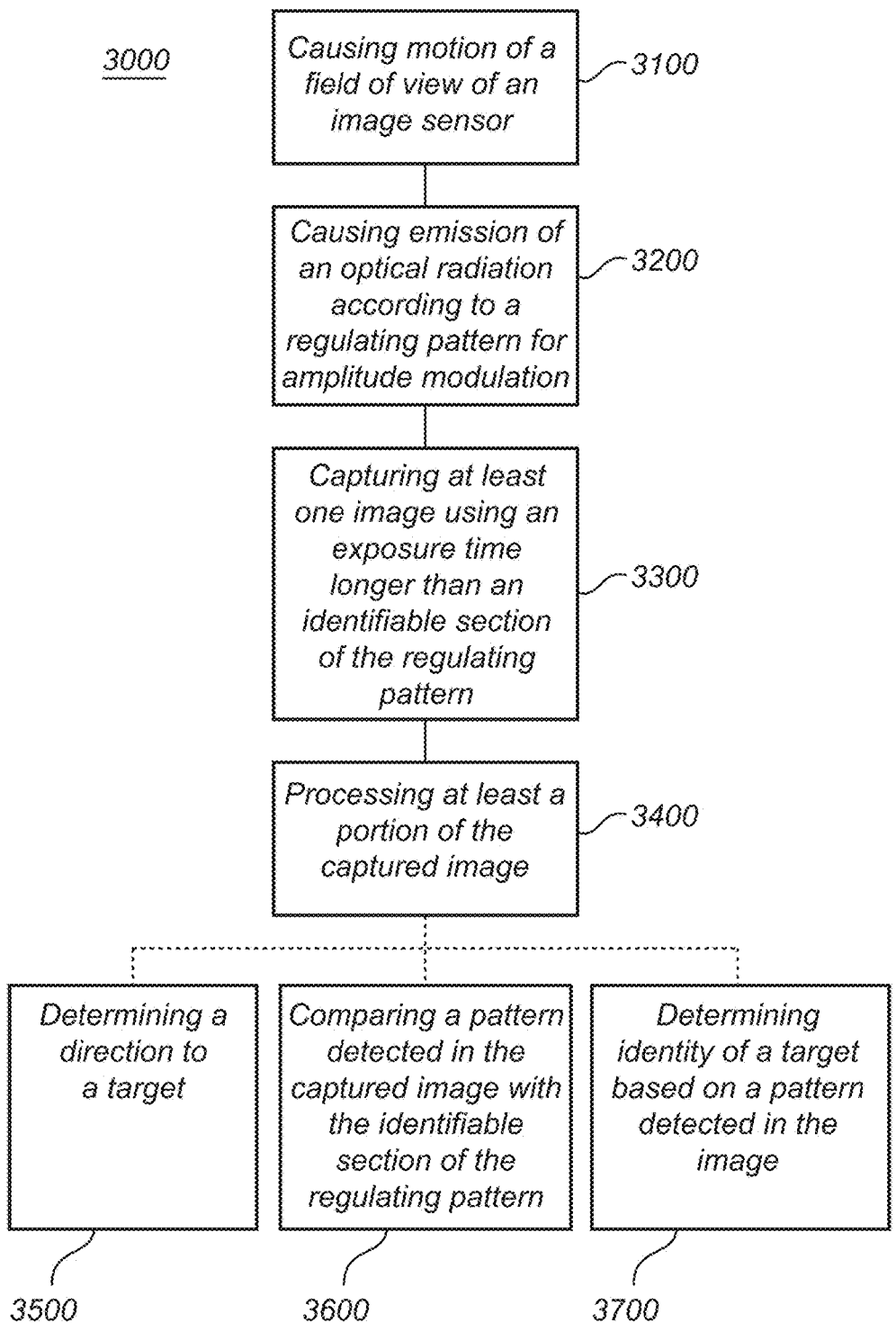
FIG. 3 shows the outline of a method according to an embodiment.

With reference to FIG. 3, the principle of operation of the measuring instrument 100 described with reference to FIG. 2 will be explained in more detail.

FIG. 3 shows the outline of a method implemented in the measuring instrument 100 for detecting presence of a target 180.

The method 3000 includes a step 3100 of causing motion of a field of view 150 of an image sensor 115 of the geodetic instrument 100.

Optionally, for applications with passive targets, the method may comprise a step 3200 of causing emission of an optical radiation from the geodetic instrument 100 in a direction of the field of view 150 of the image sensor 115. This option will be illustrated in more detail with reference to FIG. 6.

The method may include a step 3300 of capturing at least one digital image with the image sensor 115 under motion of the field of view 150 using an exposure time which is longer than an identifiable section of a regulating pattern for modulation of the optical radiation either emitted (in the case of active targets), or reflected by (in the case of passive target), the target 180. The method may then include a step 3400 of processing at least a portion of the captured image for detecting in such a portion the identifiable section of the regulating pattern. As such, the detection of the identifiable section of the regulating pattern indicates the presence of the target 180 in the vicinity of the geodetic instrument 100.

Referring to FIG. 4, examples of regulating patterns used for modulation of the optical radiation are described.

FIG. 4 shows a first regulating pattern 4100 for amplitude modulation of the optical radiation. With this regulating pattern 4100, light pulses are emitted at a periodicity $t_1$ with an amplitude varying between 0 and 1 (or 0 and 100% of the total power of the light source or light emitting target). In the graph illustrating the regulating pattern 4100 used for amplitude modulation of the optical radiation, the horizontal axis represents the time and the vertical axis represents the amplitude or intensity (I) of the transmitted light pulse. Such a regulating pattern 4100 results in a target emitting (or reflecting) light pulses, i.e. a blinking target. In this first regulating pattern 4100, an identifiable section may correspond to a portion of the regulating pattern extending in time over more than one period $t_1$, preferably at least two periods ($2 \times t_1$), for amplitude modulation of the optical radiation. The image sensor 115 may then be caused to capture an image using an exposure time which is longer than $t_1$.

FIG. 4 shows another example of a regulating pattern 4200 for amplitude modulation. In this second example, an identifiable section of the regulating pattern 4200 may correspond to a portion of the regulating pattern extending over the time period $t_2$, which includes two maximum values for amplitude modulation. The image sensor 115 may then be caused to capture an image using an exposure time which is longer than $t_2$. Other sections, i.e. portions of the regulating pattern, may be used as long as they are identifiable in the captured image, i.e. as long as at least two distinguishable events of the regulating pattern can be captured on the image (which depends on the exposure time used for capturing the image).

FIG. 4 shows a third example of a regulating pattern 4300 for wavelength modulation of the optical radiation. In this graph, the horizontal axis represents the time while the vertical axis represents the wavelength of the transmitted light. In this regulating pattern 4300, the wavelength of the light is varied from a first wavelength $\lambda_1$ to a second wavelength $\lambda_2$ in a repetitive manner at a specific frequency (1/T). The transmitted light, which in this case may be continuous, may switch between for example blue and red. In this third example, an identifiable section of the regulating pattern may correspond to the time period $t_3$ including three color shifts of the optical radiation. Other identifiable sections, with fewer or more color shifts, may be used for such regulating patterns. The image sensor 115 is then caused to capture an image using an exposure time which is longer than $t_3$.

Generally, the identifiable section may include at least two distinguishable events of the regulating pattern for amplitude and/or wavelength modulation and/or may correspond to more than one period for amplitude and/or wavelength modulation of the optical radiation, such as described in the above embodiments.

It will be appreciated that FIG. 4 shows only a few examples of possible regulating patterns and that other regulating patterns may be used.

As the field of view is moved while the image is captured, the background of the image becomes blurred whereas the identifiable sections with their respective distinguishable events of the regulating patterns result in corresponding specific patterns in the captured image. In particular, if the light emitted from the target 180 is modulated in amplitude according to the regulating pattern denoted 4100 in FIG. 4 (a blinking target), a series of bright spots corresponding to the blinking target will appear in the captured image along a direction corresponding to the motion of the field of view 150 of the image sensor 115. A modulation in amplitude according to the regulating pattern denoted 4200 in FIG. 4 would also result in a specific pattern of varying light intensities (or brightness) in the captured image. A blinking target (or pulsed light source) may however be advantageous in that it provides more distinct spots (bright pixels) in the captured image. A modulation in wavelength according to the regulating pattern denoted 4300 in FIG. 4 would result in an image in which a line with varying color is obtained along a direction corresponding to the motion of the field of view of the image sensor 115.

Still referring to the exemplifying regulating pattern 4100 shown in FIG. 4, a distance between two bright spots may be determined in the captured image as long as the two bright spots are located in different pixels with one dark pixel in between, i.e. as long as the pixel size of the image sensor is less than a distance corresponding to the motion of the field of view during the exposure time and less than a distance corresponding to the period of time between two distinguishable events of the identifiable section. Depending on the speed used for motion of the field of view 150, it is possible to determine the blinking frequency of the target 180 and thereby identify the target 180 if the frequency used by this specific target 180 is known by the geodetic instrument 100.

With reference to FIG. 5, a more detailed illustration of a measuring instrument according to some embodiments is provided.

FIG. 5 shows a measuring instrument 100 which is equivalent to the measuring instrument described with reference to FIG. 2 except that it illustrates in more detail the following features.

The measuring instrument 100 may be equipped with at least one actuator (or driving means) 120, a control unit (or controlling means) 130 and a processor (or processing means) 140.

The measuring instrument 100 is configured to detect and/or identify the target 180 located in its vicinity. Although it is referred to a measuring instrument, it will be appreciated that the image sensor 115, the actuator(s) 120, the control unit 130 and the processor 140 may be embodied in a tracker unit providing tracking functionalities. Such a tracker unit may be located in a measuring instrument such as a geodetic scanner or a total station.

For illustrative purposes, the image sensor 115 or camera 110 is shown in FIG. 5 to be mounted on a rotational axis 112, which may be arranged along a vertical direction, of the body 170 of the measuring instrument 100. The camera 110 and thereby the image sensor 115 with its field of view 150 may therefore be moved by e.g. rotation about the vertical axis 112. For this purpose, one or more actuators 120 may be arranged to cause the rotation of the camera 110 about this axis such that the field of view 150 of the image sensor 115 is moved. For this purpose, the measuring instrument may be equipped with a motor. The motion of the camera 110 and thereby the motion of the field of view 150 of the image sensor 110 is represented by an arrow around the vertical rotational axis 112 in FIG. 5.

The control unit 130 is configured to cause the image sensor 115 to capture at least one digital image or a video feed during motion of the field of view 150 by the actuator 120 using an exposure time which is longer than an identifiable section of a regulating pattern for modulation of an optical radiation either emitted or reflected by the target 180. The processor 140 is configured to process at least a portion of the captured image for detecting in such a portion the identifiable section of the regulating pattern.

According to an embodiment, the controller 130 may be a remote unit which communicates with the measuring instrument and its element by wireless communication. It will be appreciated that although the measuring instrument 100 is described with a single controller 130 comprising functionalities for controlling the image sensor for tracking purposes, the measuring instrument may comprise a separate control unit for controlling other functionalities such as e.g. distance measurements.

Although not shown in detail in FIGS. 2 and 5, the measuring instrument 100 may be equipped with a distance measurement unit for measuring distances and for performing surveying operations.

The image sensor 115, the actuator 120, the control unit 130 and the processor 140 may form a tracker unit adapted to distinguish the target 180 in the vicinity of the geodetic instrument 100 from other targets and/or surroundings of the target.

It will be appreciated that the surroundings of the target may in some cases mask the target if the surroundings include for instance highly reflective objects, such as a very bright wall, providing light at a higher intensity level than the target itself. If there is enough ambient light for the camera to saturate, the blinking pattern may not be visible. For this reason, some type of chromatic filter may be used to cancel out all light except the wavelength used (i.e. emitted or reflected by the target). Further, it may also be beneficial to shorten the exposure time in order to prevent over saturation.

The exposure time used by the image sensor 110 may be adjusted electronically or mechanically by means of a shutter arranged in front the image sensor 115.

There are two types of electronic shutters on modern camera sensors, rolling shutter and global shutter. Rolling shutter operates as a traditional curtain shutter where the exposure starts at the first line of pixels of the camera sensor and then "rolls" across the sensor towards the opposite end of the sensor. The end of the exposure occurs first at the same line where the exposure started first, and then again rolls across the sensor. This means that the exposure length is the same for all lines of pixels but that the exposure of the lines is shifted in time.

Global shutter means that the exposure of all pixels starts and stops simultaneously. This is similar to a traditional diaphragm shutter at the aperture of the lens.

A global shutter sensor may be most suitable in the present method but a rolling shutter sensor may also be used if the effects of the shifted exposure are taken into account.

As mentioned above, rolling shutter is a method of image acquisition in which an image is recorded by scanning across the frame either vertically or horizontally. As not all parts of the image are recorded at exactly the same time, imaging under motion of the field of view will create distortions in the captured image. The measuring instrument may be configured to compensate for such distortions since the displacement profile and/or speed for motion of the field of view is known to the measuring instrument and the type and the extent of the distortions can be predicted.

If the direction of movement is along the lines (where each line has a slightly different timing of the exposure) the exposure shift will move the target slightly along the direction of the movement. A compensation may be performed in particular when determining the position of the target. A correction based on the line on which the target appears may be applied to the calculated position.

If the direction of the movement is across the lines (where each line has a slightly different timing of the exposure) this will instead change the spatial frequency of the signal on the camera sensor. Compensation may be performed in particular in analysis looking for the target.

In addition to the exposure time, other operation parameters that have to be selected by a user or a control system are the speed (or displacement profile) for motion of the field of view, the size of the identifiable section of the regulating pattern and the frequency at which the images are captured. A general rule may be that the parameters are selected such that two distinguishable events of the regulating pattern can be located in two different pixels of a captured image. Further, in case several patterns are overlapping and cannot be distinguished, it may be possible to alter some of these operation parameters, such as for instance the exposure time, for capturing a new image and thereby limit the number of patterns detectable in the new image. It may also be envisaged to adjust the frequency at which the images are captured such that more than one image is captured during the exposure time.

For example, the movement of the field of view may preferably be fast enough for the blinking of the target to transform into a spatial signal on the image sensor (detector), with a spatial frequency that is low enough to be detected by the sensor. The highest spatial frequency of the transformed signal may preferably be lower than the Nyqvist frequency of the detector.

As a further example, the exposure may not be too long if the position of the target is to be determined. If the exposure time was long enough for the target to move across the entire field of view, the target would be outside the field of view both when the exposure starts and ends, thereby complicating the determination of the target position unless the transmitted blinking pattern is very complex.

Further, the time between two consecutive images during motion of the field of view (i.e. during a sweep) may be adjusted. If the exposure time is short, a high blinking frequency would be needed to obtain an identifiable portion of the code within the exposure time. According to the consideration above, this corresponds to a high sweep speed in order to convert the high blinking frequency to a low enough spatial frequency. If the time between consecutive images is long and the speed is high, there is a risk that the target will pass across the field of view while there is no exposure, i.e. while there is no image captured.

The examples described in the above embodiments are equally applicable to an active target, i.e. a target emitting light, and a passive target, i.e. a target being a reflector or comprising a reflective surface.

FIG. 6 illustrates a measuring instrument according to an embodiment adapted to the use of a passive target. For applications with a passive target, the geodetic instrument 100 may be equipped with a light source (or radiation source) 160 adapted to emit light in the direction of the field of view 150 of the image sensor 115.

The light source 160 may in an embodiment be adapted to emit a light beam pointing at the same position or angular direction 162 as the image sensor 110. The control unit 130 may be configured to synchronize the operation of the light source 160 and the actuator 120.

The radiation source 160 may emit a laser beam at a specific wavelength or within a specific range of wavelengths. For example, the radiation source 160 may emit red or infrared light, i.e. light of a wavelength of 850 nm and above. However, the laser source of a measuring instrument such as a geodetic scanner implemented in accordance with the present embodiments is not limited to a specific wavelength. Generally, light emitted by the light source 160 is reflected against the passive target 180 and may then be imaged by the camera 110 or image sensor. The light source 160 may be regulated in a similar manner as an active target, e.g. with regulating patterns such as described with reference to FIG. 4.

The light source may be arranged coaxially with the image sensor 115. In FIG. 6, the light source is arranged eccentric to the camera but the light beam 162 is coaxially aligned with the camera 110 by means of a mirror 165. It is to be understood that the positional arrangement of the optical radiation source 160 and/or the camera 110 in the measuring instrument 100 such as depicted in FIG. 6 is exemplifying and variations are possible.

As will be illustrated in more detail in the following with reference to FIGS. 5 and 7, the field of view 150 may be rotated and/or translated.

Referring first to FIG. 5, a rotation of the field of view 150 may be obtained by rotation of the body (or fixed base) 170 of the measuring instrument 100 about the vertical rotational axis 112. In this case, the image sensor 115, which is arranged at the body 170, is physically rotated to scan the surroundings of the geodetic instrument 100. It will be appreciated that the body 170 of the instrument 100 may comprise or may be mounted on a non-rotating base itself mounted on a tripod. The body 170 may then be arranged to rotate relative to this fixed base.

The actuator or controllable drive 120 may be configured to rotate the body 170 about the vertical axis 112 relative to the base in response to an angle control signal. An angle sensor, such as an angular encoder or a magnetic or capacitive angle resolver, may produce a measurement signal, representing the angular position of the body 170, and thereby the image sensor 115, relative to such base. Input signals for the controllable drive or actuator may be provided by the controller 130.

Although one actuator or controllable drive 120 for rotating the field of view of the image sensor 115 is shown in FIG. 5 for illustrative purposes, it will be appreciated that additional actuators may be provided for moving the field of view of the image sensor relative to the base (or the target) differently (e.g. a translational movement or a combination of both rotation and translation).

Other alternatives for rotation of the field of view are described in the following. For example, FIG. 7 shows a measuring instrument in which a camera 710 of the measuring instrument 100 comprises an optical element 718 arranged in the optical path of the image sensor 715. FIG. 7 illustrates a rotation of the field of view by translation of the image sensor 715 relative to the optical element 718. In particular, FIG. 7 illustrates that the translation of the image sensor 715 from a first position (upper configuration in FIG. 7) providing a field of view 750 to a second position (lower configuration in FIG. 7) results in another field of view 750'.

Generally, the actuator(s) 120 may be arranged to move the field of view by translating the image sensor 115 relative to the optical element or translating such an optical element relative to the image sensor for causing the field of view 150 to rotate. In the latter case, still referring to FIG. 7, the image sensor 715 would not itself be moved but the translation of the optical element 718 in front of the image sensor 715 would cause the field of view 750 of the image sensor 715 to rotate. According to another alternative, the field of view may be rotated by introducing or moving a second optical element (not shown) in the optical path defined by the first optical element and the image sensor.

As another example, the field of view may be translated by translating the camera 110, i.e. both the image sensor 115 and any optical element, along a horizontal direction.

The control unit 130 may be adapted to cause the actuator 120 to rotate and/or translate the field of view 150 of the image sensor 115 at a constant rotation and/or translation speed, or according to another displacement profile.

Turning again to FIG. 3, for the case of a rotational displacement of the field of view 150, the method may further include a step 3500 of determining a direction to the target relative to the measuring instrument 100. The determination of the direction or angular orientation 880 of the target 180 relative to the measuring instrument 100 is further illustrated in FIG. 8.

The direction to the target 180 may be determined on the basis of a profile for angular orientation of the field of view 850 of the image sensor or camera 110 with which the image is captured, i.e. the speed at which the field of view is rotated (in case it is constant) or the relationship between the rotational displacement and time (in case the rotational speed is not kept constant), and a position of the pattern in the captured image. FIG. 8 illustrates the image plane 855 in which the target 180 is located at the instant the camera 110 captures an image.

With the profile for angular orientation of the field of view of the image sensor, a pixel of the captured image may be correlated with an angular direction. Thus, the direction to the target relative to the geodetic instrument may be derived from the position of a spot or a distinguishing event of a pattern (representative of the target) detected in the captured image It will be appreciated that the camera 110 (or image sensor) may be calibrated such that it is known, for a specific image to which direction or angular orientation a pixel in the image corresponds. In particular, the camera 110 (i.e. the image sensor and its optical system) may be calibrated such that every pixel in the image sensor is related to an angle.

Further, depending on the type of movement of the camera field of view, different camera projections may be desired.

If the camera field of view is translated in the plane of the camera sensor, an f/tan(theta) projection may be preferable, wherein f is the focal length of a lens arranged in front of the camera sensor and theta is the angle of an incident light ray relative to the normal of the plane of the camera sensor. This type of projection means that a test pattern on a flat wall perpendicular to the camera line of sight may be imaged without distortion onto the camera sensor. In this case, each pixel corresponds to a certain distance on the wall.

If the camera field of view is rotated around the entrance pupil of the camera, an f/theta projection may be suitable (wherein f is the focal length of a lens arranged in front of the camera sensor and theta is the angle of an incident light ray relative to the normal of the plane of the camera sensor). This type of projection means that each pixel corresponds to a certain angle. In other words, this means that a spherical surface will be projected onto the camera sensor.

Further, there might also be some degree of distortion because of imperfection of the lens. The distortion and/or any incorrect choice of lens projection may affect both the target position and the frequency of the spatial signal on the camera sensor. If the distortion is too significant, it may cause a target to move along a curved path, especially at the edges of the image.

These effects may be compensated for by selecting a lens having a more correct projection and a lower distortion or by adjustment of the processing algorithms.

For the case of a translational displacement, the method may further comprise determining a direction to, and/or a position of, the target relative to the geodetic instrument on the basis of a translational position of the field of view of the image sensor at which the image is captured and a position of the pattern in the captured image.

Turning again to FIG. 3, as the regulating pattern used for modulation of the optical radiation is known to the measuring instrument 100, and in particular to its processor, the method may further include a step 3600 of comparing the identifiable section of the regulating pattern with at least part of a pattern detected in the captured image. The identifiable section of the regulating pattern may be identified or retrieved on the basis of at least part of a pattern detected in at least one portion of the captured image and a motion speed (in the case of a constant speed), or displacement profile, of the field of view of the image sensor.

Alternatively or in addition, the regulating pattern may provide information about the target, such as the position of the target, the type of target and/or any other geometrical or position-related parameters of the target. For this purpose, the processor 140 of the measuring instrument 100 may be configured to correlate any characteristic of a pattern detected in the captured image to such an information. The processor may be coupled to a memory or other kind of look-up table or register in which a specific section of a regulating pattern is related to a specific information. In an embodiment, the method illustrated in FIG. 3 may include a step of determining 3700 an identity of the target based on at least part of a pattern detected in the captured image.

The processing of the captured image may include different techniques based on for example image frequency analysis, wavelet analysis and/or template/pattern matching. The method may also include the transformation of at least a portion of the captured image from a spatial domain representation into a spatial frequency domain representation. Such kind of processing will be described in more detail in the following with reference to FIGS. 9-11.

Figure 9:
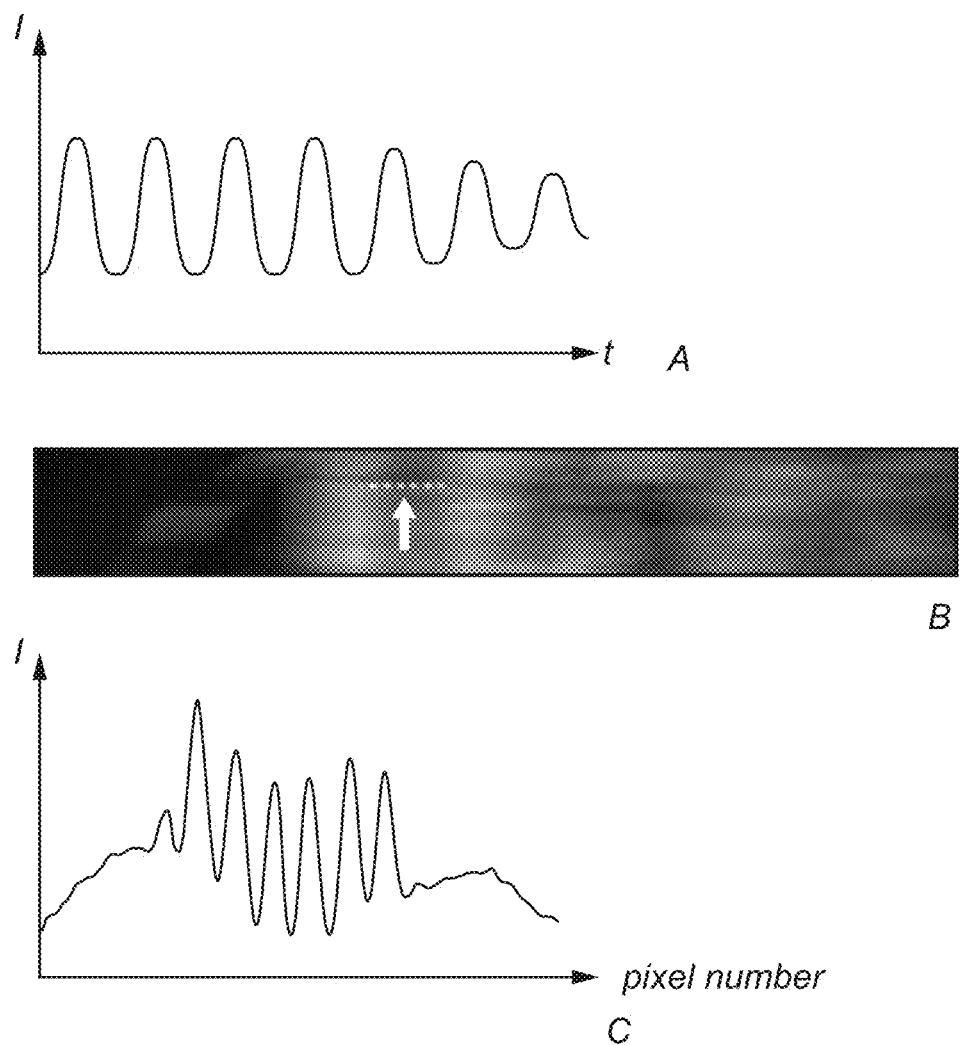
FIG. 9 shows an example of a regulating pattern, a portion of a digital image captured for such a regulating pattern and the corresponding data (brightness level) obtained from the captured image.

Graph A of FIG. 9 shows a regulating pattern for amplitude modulation of an optical radiation emitted from a stationary target 180, namely a light-emitting diode (LED) blinking at a certain frequency. Such a target may be situated at a certain distance from the measuring instrument 100. The horizontal axis of graph A represents time while its vertical axis represents the intensity of the emitted optical radiation.

The measuring instrument 100 equipped with a CMOS image sensor may then sweep horizontally over a scene at which the target 180 is located while an image comprising the target is captured. A portion of the captured image is shown in photograph B of FIG. 9, where it can be seen how the movement of the camera causes the surroundings of the target 180 in the image (i.e. the background of the image) to become blurred, while the target 180 appears as a series of bright spots arranged in a succession parallel to the direction of motion of the image sensor 115 relative to the surroundings of the target 180. The series of bright spots is indicated by an arrow in FIG. 9.

Graph C illustrates the variation of the light intensity (or brightness) along an horizontal line of the captured image, and in particular along a line passing by the series of bright spots. Graph C shows therefore some kind of reconstruction of the regulating pattern according to graph A used to modulate the optical radiation of the light emitting target. The horizontal axis of graph C represents the pixel number while the vertical axis represents the brightness level in the captured image.

From the data obtained in graph C, the frequency used for modulating the amplitude of the optical radiation may be derived, thereby allowing for an identification of the target by the measuring instrument.

The captured image as shown in photograph B of FIG. 9, or rather the data shown in graph C of FIG. 9, may then be processed by a computer so as to produce a transformation of the image from the spatial domain to the spatial frequency domain.

Figure 10:
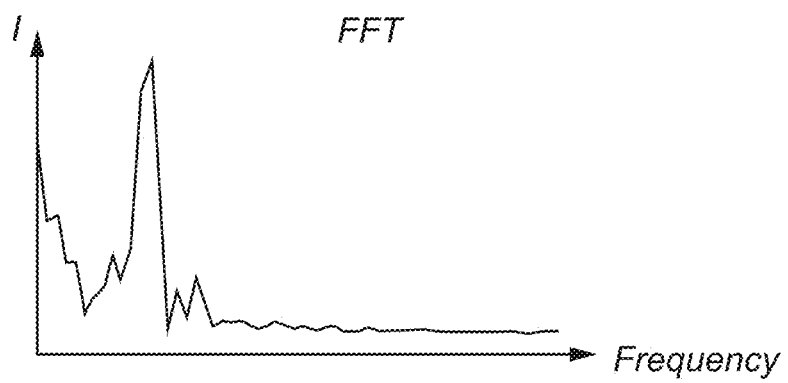
FIG. 10 illustrates the result of a Fourier transform of a portion of the captured image shown in FIG. 9.

FIG. 10 shows a Fourier transform (in arbitrary units) of graph C shown in FIG. 9, i.e. a Fourier transform of the brightness level along a line of pixels in the captured image along a direction of relative motion between the image sensor and the surroundings of the target.

Fourier transformation, or any other transformation of a similar kind, is suitable for revealing the frequency of a repetitive pattern present in a captured image or a portion (or line of pixels) of the captured image. The principle is based on a multiplication of the intensities in the pixels, i.e. of the pattern in the captured image, with a number of frequency dependent functions. The functions corresponding in frequency to the pattern present in the captured image provide a peak in the Fourier transform graph, thereby revealing the frequency representative of the pattern detected in the captured image. If the processor or computer knows what target to search for, i.e. what frequency (as a specific target may have a certain pattern with its own frequency), it may be possible to only search for the specific frequency in the Fourier transform to determine presence of the target in the captured image.

In FIG. 10, the horizontal axis denotes frequency while the vertical axis represents an amplitude of the Fourier transform result, given in arbitrary units. In FIG. 10, the curve corresponds to the line of pixels with the repetitive bright spots and therefore comprises a peak at a specific frequency or frequency range. This specific frequency corresponds to the frequency used for amplitude modulation of the optical radiation emitted from the target.

Although the above example shows only one target, it may be envisaged that several targets are present in the scene captured by the image sensor. Each of the targets may then be detected if each of them has a specific frequency for amplitude modulation (or wavelength modulation). Assuming that the operation parameters are optimized for all these targets (exposure time and motion speed), several distinct peaks would be obtained at different frequencies in the Fourier transform. If the computer or processor of the measuring instrument knows what target to search for, it would then be possible to only check the channels corresponding to the frequencies corresponding to such targets.

It will be appreciated that if two targets are located close to one another and aligned along the line of movement, a portion of their spatial signals in the motion blurred image may overlap. If the two targets transmit (or reflect) the same signal it may be difficult to separate them. However, if the two targets transmit different signals the two targets can be separated, unless the sum of the signals oversaturates the camera sensor.

With reference to FIG. 11, several exemplifying regulating patterns for amplitude modulation of a number of targets are shown together with schematic representations of their corresponding Fourier transforms (or representations in a spatial frequency domain).

FIG. 11 shows four regulating patterns (or regulating profiles) for modulating the amplitude of light emitted at a target or reflected by a target. The regulating patterns denoted 1110, 1120 and 1130 are representative of a first target, a second target and a third target (not shown), wherein the straight and horizontal lines of the dashed lines, or dots of the dotted line, represent the periods of time during which the light is turned on and the spaces between these straight and horizontal lines, or dots, represent the periods of time during which the light is turned off.

With this schematic representation, the regulating pattern denoted 1110 provides an amplitude modulation at a lower frequency than the regulating pattern denoted 1120 which itself provides an amplitude modulation at a lower frequency than the regulating pattern denoted 1130. For exemplifying purposes, the regulating patterns 1110 and 1120 may correspond to two different active targets, i.e. light sources located at these targets are configured to emit light according to these two regulating patterns, and the regulating pattern 1130 may correspond to a passive target, i.e. a light source located at the measuring instrument may be modulated according to such a regulating pattern. The regulating pattern 1140 illustrates a light source with constant illumination, i.e. without any modulation in amplitude.

Graphs 1150-1180 of FIG. 11 illustrate the Fourier transforms for each of these targets wherein the graph denoted 1150 corresponds to the regulating pattern denoted 1110, the graph denoted 1160 corresponds to the regulating pattern denoted 1120, the graph denoted 1170 corresponds to the regulating pattern denoted 1130 and the graph denoted 1180 corresponds to the regulating pattern denoted 1140.

The graph denoted 1150 shows a peak located at a lower frequency than the peak of the graph denoted 1160. Similarly, the peak shown in the graph denoted 1160 is located at a lower frequency than the peak of the graph denoted 1170. The graph denoted 1180 does not show any peak since the light used for this target is not modulated in amplitude. Such a graph 1180 would also correspond to an unexposed line in a captured image, i.e. the Fourier transform of a line covering only the background of a captured image (not passing by a series of bright spots representative of a target).

As mentioned above, it may be sufficient to process only a portion of the captured image. For this purpose, the method may include a step of identifying a pattern in the captured image and then processing a portion of the captured image in which the pattern has been identified. In case several patterns, and thereby several targets, are identified, it may be possible to process different portions of the captured image. This is advantageous since a transformation of the whole captured image from a spatial domain representation into a spatial frequency domain representation may be computationally expensive, e.g., time-consuming and/or requiring expensive hardware.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements. In the above, a processor or processing unit may include, by way of example, a general purpose processor, a special purpose processor, a conventional processor, a digital signal processor (DSP), a plurality of microprocessors, one or more microprocessors in association with a DSP core, and any other type of integrated circuit (IC).

Further, although applications of the measuring instrument or tracker unit has been described with reference to surveying systems, the present disclosure may be applicable to any systems or instruments in which a target or object has to be detected in the vicinity of such a measuring instrument. A tracker unit comprising an image sensor, an actuator, a control unit and a processor such as defined in accordance with any one of the above described embodiments may be integrated in such a measuring instrument.

Furthermore, the tracker unit may comprise one or more micro-processors or some other device with computing capabilities, e.g. an application specific integrated circuit (ASIC), a field programmable gate array (FPGA), a complex programmable logic device (CPLD), etc., in order to perform operations for operating the tracker unit. When performing steps of different embodiments of the method of the present disclosure, the microprocessor may execute appropriate software that is downloaded to the tracker unit and stored in a suitable storage area, such as for example a Random Access Memory (RAM), a Flash memory or a hard disk drive. Such a microprocessor or processing unit may alternatively or optionally be located externally relatively to the tracker unit (and electrically connected to the tracker unit).

The present invention is also applicable as an upgrade and may be integrated in measurement systems already comprising an image sensor, an actuator for inducing motion of the field of view of the image sensor, a control unit and a processor, wherein the control unit and the processor are adapted to perform the steps of the methods according to any one of the embodiments described herein.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method implemented in a measuring instrument for detecting presence of at least one target, said method comprising:
    forming, by a first optical element of the measuring instrument, a field of view of an image sensor of the measuring instrument;
    creating relative movement between the first optical element of the measuring instrument and the image sensor of the measuring instrument causing motion of the field of view of the image sensor of said measuring instrument relative to said at least one target;
    capturing at least one digital image with said image sensor under motion of said field of view using an exposure time which is longer than an identifiable section of a regulating pattern for modulation of an optical radiation either emitted or reflected by said at least one target; and
    processing at least one portion of the at least one digital image for detecting in said at least one portion the identifiable section of the regulating pattern.

2. The method of claim 1, wherein the regulating pattern provides an amplitude modulation of the optical radiation and/or a wavelength modulation of the optical radiation.

3. The method of claim 1, wherein the identifiable section includes at least two distinguishable events of said regulating pattern for modulation and/or wherein the identifiable section corresponds to more than one period for modulation of the optical radiation.

4. The method of claim 1, wherein the motion of the field of view includes a rotation.

5. The method of claim 4, wherein creating relative movement between the first optical element includes translating the image sensor relative to the first optical element or vice versa or moving a second optical element in an optical path defined by the first optical element and the image sensor.

6. The method of claim 4, further comprising determining a direction to said at least one target relative to said measuring instrument on the basis of a profile for angular orientation of the field of view of the image sensor with which the image is captured and a position of the identifiable section of the pattern in the at least one digital image.

7. The method of claim 1, wherein the motion of the field of view includes a translation.

8. The method of claim 7, wherein the measuring instrument further comprises the image sensor and the first optical element disposed on a fixed base and wherein the field of view is translated by translating the image sensor together with the first optical element relative to the fixed base.

9. The method of claim 7, further comprising determining a direction to, and/or a position of, said at least one target relative to said measuring instrument on the basis of a translational position of the field of view of the image sensor at which the image is captured and a position of the identifiable section of the pattern in the at least one digital image.

10. The method of claim 1, wherein the processing includes comparing the identifiable section of the regulating pattern with at least part of a pattern detected in the at least one digital image.

11. The method of claim 1, wherein the processing includes identifying the identifiable section of the pattern for modulation on the basis of at least part of a pattern detected in said at least one portion of the at least one digital image and a motion speed, or displacement profile, of the field of view of the image sensor.

12. The method of claim 1, further comprising determining an identity of said at least one target based on at least part of a pattern detected in the at least one digital image.

13. A computer program product stored on a non-transitory computer readable medium comprising computer-executable components for causing a tracker unit to perform a method according to claim 1 when the computer-executable components are executed on a processing unit.

14. A measuring instrument comprising:
    an image sensor;
    an optical element
    an actuator arranged to create relative movement of the image sensor and the optical element to move a field of view of said image sensor;
    a controller coupled to the image sensor configured to cause the image sensor to capture at least one digital image during motion of said field of view by the actuator using an exposure time which is longer than an identifiable section of a regulating pattern for modulation of an optical radiation either emitted or reflected by at least one target;
    a shutter to control the exposure time; and
    a processor configured to process at least a portion of the at least one digital image for detecting in said at least one portion the identifiable section of the regulating pattern.

15. The measuring instrument of claim 14, wherein the regulating pattern provides an amplitude modulation of the optical radiation and/or a wavelength modulation of the optical radiation.

16. The measuring instrument of claim 14, wherein the identifiable section includes at least two distinguishable events of said regulating pattern for modulation and/or wherein the identifiable section corresponds to more than one period for modulation of the optical radiation.

17. The measuring instrument of claim 14, wherein the actuator is configured to rotate the field of view.

18. The measuring instrument of claim 17, wherein the optical element forms the field of view of the image sensor and wherein the actuator is configured to rotate the field of view of the image sensor by translating the image sensor relative to the optical element or vice versa, rotating the optical element and the image sensor, or moving a second optical element in an optical path defined by the optical element and the image sensor.

19. The measuring instrument of claim 14, wherein the actuator is configured to translate the field of view.

20. The measuring instrument of claim 19, wherein the actuator is configured to translate the field of view of the image sensor by translating the image sensor together with the optical element determining the field of view of the image sensor.

* * * * *